UNITED STATES PATENT OFFICE.

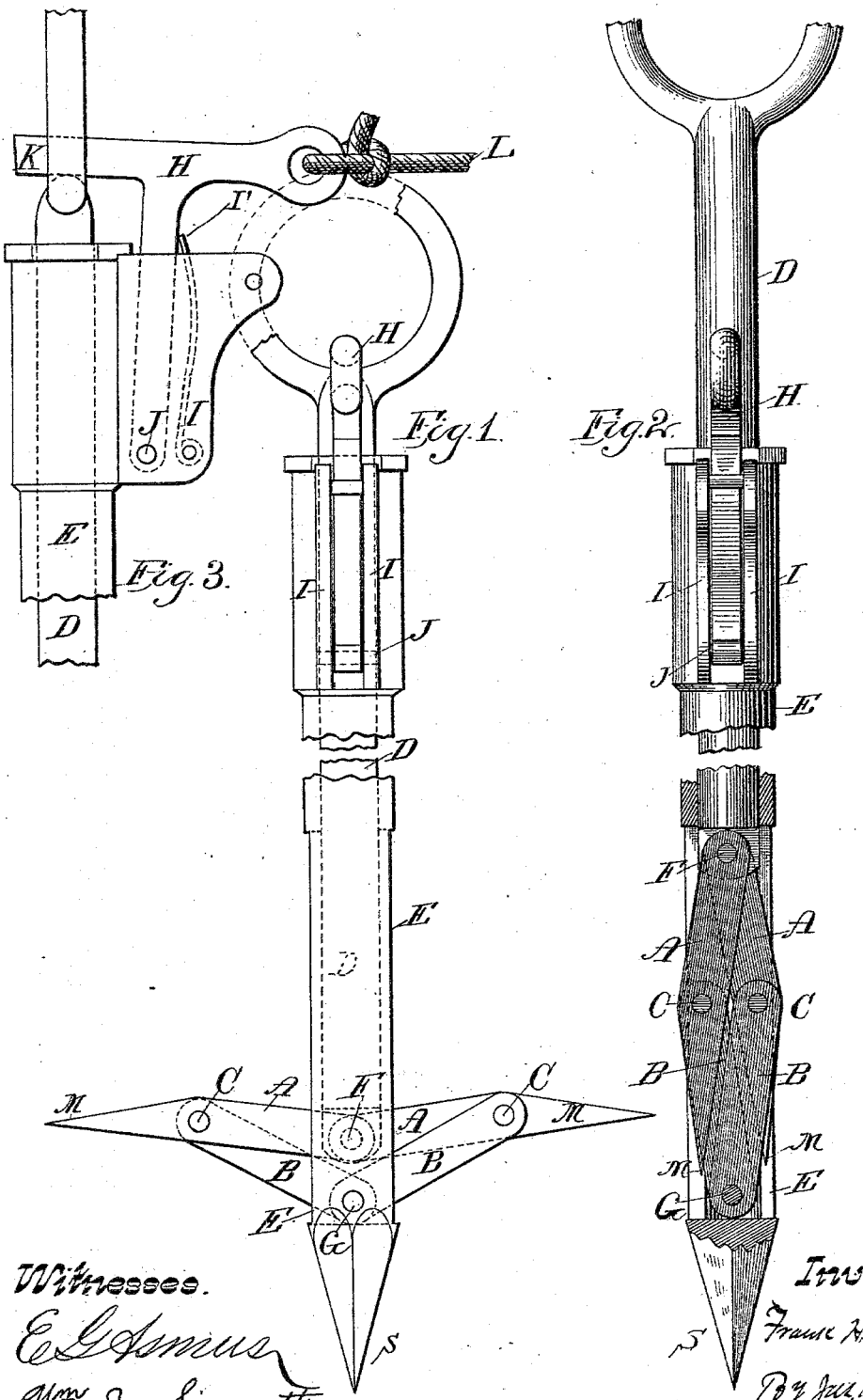

FRANK H. BOLTE, OF MILWAUKEE, WISCONSIN, ASSIGNOR TO THE EGELHOFF MANUFACTURING COMPANY, OF SAME PLACE.

HORSE HAY-FORK.

SPECIFICATION forming part of Letters Patent No. 283,694, dated August 21, 1883.

Application filed December 9, 1882. (No model.)

*To all whom it may concern:*

Be it known that I, FRANK H. BOLTE, a citizen of the United States, residing at Milwaukee, in the county of Milwaukee and State of Wisconsin, have invented certain new and useful Improvements in Horse Hay-Forks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in horse hay-forks, and pertains to that class for which Letters Patent of the United States, No. 58,110, were granted to Thomas Lloyd. In said class of forks, as heretofore constructed, the prongs or devices for retaining the hay, when being lifted, were attached to the exterior surface of a solid bar, and the points upon the end of the retaining-prongs were curved upward. By my improvements a hollow bar or tube is substituted for the solid bar previously used, and shown in said patent, into which tube the lifting-prongs are drawn when folded, preparatory to inserting said bar into the hay, and the points of said lifting-prongs are made straight instead of curved, and when folded are brought parallel with, instead of at right angles to, the retaining-bar.

My invention also pertains to the peculiar construction of the device for locking and retaining the lifting-prongs, respectively, when lifting and discharging the hay, all of which is further explained by reference to the accompanying drawings.

Figure 1 represents a side view of my invention, showing the lifting-prongs extended. Fig. 2 is also a side view with tube broken away, showing the lifting-prongs folded. Fig. 3 represents the tripping device, drawn at right angles to that shown in Figs. 1 and 2.

The lifting-prongs consist of two pairs of elbow-jointed bars, A and B, which are connected together by pivots C C. The upper ends of the bars A are attached by a pivot, F, to the lower end of the rod D, and the lower end of the bars B are attached by pivot G to the tube E above the point S. The rod D is adapted to move upward and downward in the tube E, and when thus moved it contracts and extends the lifting-prongs, as shown in Figs. 1 and 2. Fig. 2 shows the rod D drawn upward and the prongs folded within the tube, preparatory to being inserted into the hay. Fig. 1 shows the rod thrown downward and the prongs extended in position for lifting the hay.

It is obvious, as shown in Fig. 1, that the respective spaces between the pivots C C and G are greater than those between C C and F, and that consequently the upper pair of levers may be extended in a horizontal position in line with each other, while, owing to the greater length of the bars B B, their upper ends being secured by pivots C C to said upper bars, it becomes impossible to extend them farther, and they are consequently retained by said upper bars, A A, in the angular position shown. Thus it is obvious that the lower bars, B B, form supports, and the pivots C C form fulcrums, upon which the bars A A turn when the hay is discharged therefrom. The object of extending the upper bars, A A, past the pivots C C will now be apparent. The weight of the hay resting upon the projecting ends of said bars, and said bars being adapted to turn upon the pivots C C, as mentioned, the inward ends of said bars A are consequently thrown upward by the gravity of the hay, thus carrying with them the rod D, to which they are attached, thereby causing said levers to be withdrawn from the hay and folded within the tube, as shown in Fig. 2. Thus by projecting the ends of the bars A A past the pivots C C the gravity of the hay aids in tripping the fork.

I am aware that elbow-joint levers of dissimilar lengths have been previously arranged so that the lower pair were capable of being extended in a horizontal position at right angles to the bar, while the upper levers were retained at an angle thereto corresponding to that of an inverted V. The levers thus arranged have, however, proven impracticable, as it was difficult to trip them or discharge the hay therefrom. The upper end of the pipe is provided with a tripping-latch, H, which is secured thereto in sleeve I by pivot J. The fork having been inserted in the hay and the lever or lifting-prongs having been extended, as shown in Fig. 1, by downward pressure upon the rod D the latch H is thrown forward, so that the arm $k$ passes above the end of the rod D and holds it down while the hay is being elevated by the fork. When the fork has thus conveyed the hay to the place of deposit, the latch H is drawn back from the end of the rod by drawing upon the cord L, when the weight of the hay upon the points M M of the levers A A causes them to be quickly closed within the tube, thus releasing the hay and discharging it from the fork. I' is a spring for retaining the latch above the rod D, as shown in Fig. 3.

I am aware of the device for holding the hay upon the fork, shown in Patent No. 74,064, in which the upper folding arms are respectively pivoted at fixed points to the hollow shaft upon the respective sides of the tripping-rod, said tripping-rod being pivoted at its lower end to the lower elbow-joint levers at their inner connecting ends.

I am also aware of the device shown in Patent No. 252,308, in which the tripping-rod extends below the retaining arms or levers and forms the point of the fork, which point or lower end of said tripping-rod is connected directly to the lower ends of the retaining arms or levers, while by my device the lower end of said tripping-rod is attached to the upper ends of the upper retaining-arms. I therefore make no claim to the devices shown in said patents.

Having thus described my invention, what I claim as new, and desire to secure by Letters Patent, is—

1. In a horse hay-fork, the combination of the tubular shaft E, provided with a fixed point, S, attached to the lower end of said tubular shaft, tripping-rod D, arranged within said shaft E, toggle-joint levers A A and B B, the lower ends of said levers B being attached at a fixed point to said tubular shaft E, above said point S, the upper ends of said levers A A being pivoted to the lower end of said tripping-rod D, the inner ends of said levers A A being adapted to be drawn upward when folded within said tube E, and moved downward when extended therefrom, by the action of said tripping-rod D, substantially as and for the purpose specified.

2. The combination of tripping-latch H, tubular shaft E, tripping-rod D, levers A A and B B, the lower end of said tripping-rod being pivoted to the upper ends of said levers A A, said latch H being adapted, when in its locking position upon said rod D, to retain said levers A A in a horizontal position, substantially as and for the purpose specified.

In testimony whereof I affix my signature in presence of two witnesses.

FRANK H. BOLTE.

Witnesses:
JAS. B. ERWIN,
GEO. EGELHOFF.